NEAL & EMERY.
Evaporating Pan.
No. 1,294.
Reissued March 25, 1862.
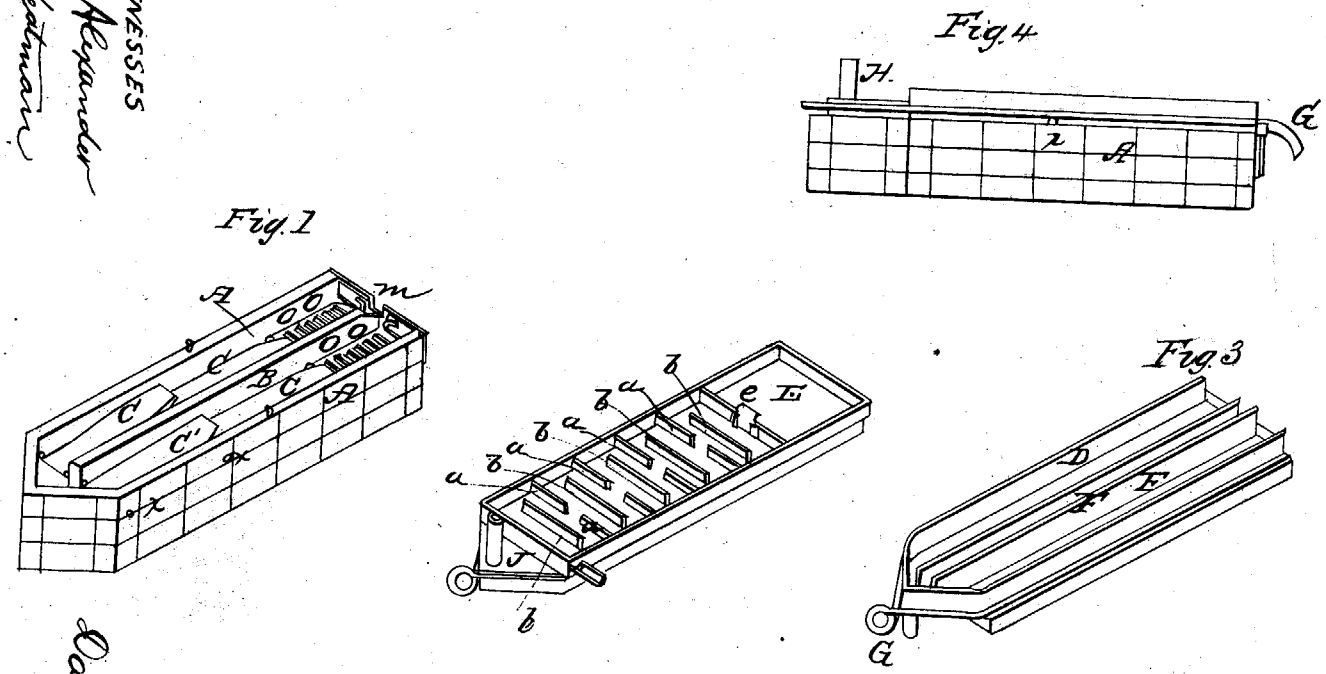
WITNESSES
C. M. Alexander
A. H. Yeatman
INVENTORS
Daniel B. Neal
H. A. Emery
N. PETERS. Photo-Lithographer, Washington, D. C.

UNITED STATES PATENT OFFICE.

DANIEL B. NEAL AND GEORGE E. HOUSE, OF MOUNT GILEAD, OHIO, ASSIGNEES OF D. B. NEAL, H. C. EMERY, AND GEORGE E. HOUSE.

IMPROVEMENT IN APPARATUS FOR EVAPORATING SACCHARINE JUICES.

Specification forming part of Letters Patent No. 27,258, dated February 21, 1860; Reissue No. 1,294, dated March 25, 1862.

*To all whom it may concern:*

Be it known that DANIEL B. NEAL and HOMER C. EMERY, of Mount Gilead, in the county of Morrow and State of Ohio, did invent a certain new and useful Improvement in Apparatus for Evaporating Saccharine Juices, for which a patent was issued to DANIEL B. NEAL, H. C. EMERY, and GEORGE E. HOUSE, as assignees of said NEAL and EMERY, on the 21st day of February, A. D. 1860, which Letters Patent having been surrendered on account of a defective specification, it is hereby declared that the following is a full and correct description of the same invention, reference being had to the accompanying drawings, in which—

Figure 1 is a perspective view of the furnace with the pan removed. Fig. 2 is a perspective view of the top of the pan. Fig. 3 is a similar view of the bottom of the pan. Fig. 4 is a side elevation of the entire apparatus complete, and Fig. 5 is a view of the crank operating the dampers.

The nature of the invention consists in the partial local cooling of a portion of the saccharine juice without arresting the boiling of the remainder, the object being in part to facilitate the removal of scum by causing it to collect in one portion of the pan, and in part to isolate, cool, and remove the completely-boiled sirup without interrupting the boiling and clarification of the crude juice, and without danger of scorching or burning the molasses, all as hereinafter more particularly set forth.

Experience in the treatment of the saccharine juice from the sorghum or Chinese sugar-cane has shown that when the boiling of the crude juice is interrupted before the clarification has been completed the scum or impurities will not rise when the boiling is renewed, and the juice or sirup after this treament will ferment and spoil. It is also a fact well known to those who have been engaged in treating this juice that an admixture of crude juice with the perfectly-boiled sirup gives to the latter a very unpleasant flavor and renders it liable to rapid fermentation. As the process of boiling approaches completion the sirup becomes thicker, and offering a less ready escape for the steam-bubbles, as well as adhering more closely to the bottom and sides of the pan, is very liable to scorch and burn. Cooling that portion of the pan which contains the thicker fluid is the obvious remedy for this danger, and the practical problem to be solved is how to effect this local cooling without lowering the temperature of the thinner portion of the juice below the boiling-point, and thus arresting its clarification. To solve this problem was the object and has been the result of the present invention.

In the drawings, A marks a furnace of suitable material and size, divided longitudinally by a partition-wall, B, extending up to within a few inches of the top of the furnace.

*o o* mark the fire-bars.

C C′ are dampers, which are situated on each side of the wall B, and are hinged at their rear ends, as seen at *x x*. Crank-shafts I—one for each damper—pass through the furnace under the dampers, and effect the raising and lowering of the forward ends of the dampers. When the forward ends of these dampers are raised, the heat from the fire-place is shut off from bottom of the pan, and passes with the products of combustion directly to the chimney. When they are lowered, the heat is brought into contact with the bottom of the pan. When any one valve is raised, that portion of the pan under which it lies is shielded from the access of heat.

D marks the pan, which is made of galvanized iron or other suitable material, and is placed on top of the furnace A. This pan is provided with a smoke-pipe, J, at its rear end, and with a bar, G, which passes horizontally around it. This bar may be omitted altogether, if preferred. The pan may be provided with the series of partitions marked *a* and *b*, which were described in the original specification; but we prefer to omit them.

E marks a portion of the pan, divided by a partition from the main part, and communicating with it by a gate, *e*. The under side of the pan (see Fig. 3) is provided with two flanges, F F, running longitudinally. They fit snugly against the sides of the wall B, and form with it and with the bottom of the pan a long rectangular flue or air-chamber, through which a current of cold air will be continually flowing from front to rear while the fire is kept up in the furnace. The cold air enters this flue at *m*, and is discharged into the chimney H.

It is found by practical experiment that the scum will rise most freely over that portion of the pan where ebullition is somewhat checked by cooling the bottom of the pan. Experimenters have availed themselves of this fact by causing the pan to project a short distance beyond the furnace, and thus expose a small portion of the outer edges of the bottom. This arrangement throws the scum to the sides of the pan, which are thus kept continually foul with all the impurities of the juice, causing annoyance and labor in cleansing and preventing the complete removal of the scum. By throwing a current of cool air under the middle of the pan the scum is caused to collect directly over it, and can be perfectly removed without any contact with the sides of the pan. This is one of the leading peculiarities and advantages of this invention.

The pan may be divided into two or more compartments, communicating by gates which can be closed or opened at pleasure. The crude juice is placed in the compartment directly over the fire, the molasses being drawn from that at the extreme rear of the pan. As the boiling of the sirup in this compartment approaches completion the danger of scorching is enhanced; but by throwing up the forward ends of the valves C′ the bottom of the pan under the rear compartment will be effectually cooled and the disaster entirely prevented, while at the same time the boiling of the green juice in the front compartment will not be in the least interfered with.

Having thus fully described the invention, it is not designed to limit the claims to any particular form or construction of air-flue, so long as the principle of the invention is not departed from; but

What is claimed is—

1. Leading a current of cold air under the bottom of the sugar-pan for the purpose of facilitating the removal of the scum, substantially in the manner described.

2. Cooling that portion of the pan from which the molasses is about to be withdrawn without interrupting the boiling of the crude juice in the other portions of the pan, substantially in the manner described.

In testimony whereof we have hereunto set our hands this 8th day of March, A. D. 1862.

DANIEL B. NEAL.
GEORGE E. HOUSE.

Witnesses:
R. HOUSE,
H. H. ADAMS.